United States Patent
Eschwey et al.

[11] Patent Number: 5,741,545
[45] Date of Patent: Apr. 21, 1998

[54] PROCESS FOR CONDITIONING ORGANIC SUBSTRATE SURFACES

[75] Inventors: Manfred Eschwey, Düsseldorf; Rolf van Bonn, Duisburg; Ludwig Böhm, Hattersheim; Rainer Kaps, Friedrichsdorf; Eckard Raddatz, Biebesheim, all of Germany

[73] Assignee: Messer Griesheim GmbH, Germany

[21] Appl. No.: 635,471

[22] Filed: Apr. 22, 1996

[30] Foreign Application Priority Data

Apr. 22, 1995 [DE] Germany ............... 195 14 924.6

[51] Int. Cl.$^6$ ............................................. C23C 16/02
[52] U.S. Cl. ............... 427/248.1; 427/301; 427/316; 427/322; 427/377
[58] Field of Search ............... 427/237, 248.1, 427/532, 536, 301, 316, 322, 377

[56] References Cited

U.S. PATENT DOCUMENTS

| | | | |
|---|---|---|---|
| 3,647,613 | 3/1972 | Scotland | 161/165 |
| 4,264,750 | 4/1981 | Anand et al. | 525/356 |
| 4,310,564 | 1/1982 | Imada et al. | 427/40 |
| 4,764,405 | 8/1988 | Bauman et al. | 428/35 |
| 5,527,566 | 6/1996 | Schadt et al. | 427/536 |

FOREIGN PATENT DOCUMENTS 4309532  11/1992  Japan .

*Primary Examiner*—Shrive Beck
*Assistant Examiner*—Timothy Meeks
*Attorney, Agent, or Firm*—Connolly & Hutz

[57] ABSTRACT

Organic substrate surfaces, particularly of industrial polymers, are provided by fluorination or chlorination with corresponding layers so as to obtain certain properties; for the purpose of improving the application of a layer, the surfaces are exposed beforehand at temperatures between 25° C. and 300° C. to hydrogen or a gas containing at least 0.1% by volume of hydrogen.

4 Claims, 4 Drawing Sheets

PROCESS FOR CONDITIONING ORGANIC SUBSTRATE SURFACES

BACKGROUND OF THE INVENTION

1. Field of the Invention

The invention relates to a process for conditioning organic substrate surfaces.

For the purposes of the invention, the subsequent treatment processes are, in particular, the surface fluorination of polyolefins, particularly the industrial use of gas-phase fluorination in the barrier layer formation for plastic fuel containers of high density polyethylene (HDPE). Apart from fluorination, chlorination is also a suitable subsequent treatment process according to the present invention.

2. DISCUSSION OF BACKGROUND

According to the current state of the art, gas-phase fluorination of organic molecules for the purpose of replacing all carbon-hydrogen bonds as completely as possible by carbon-fluorine bonds is subject to the following limitations:

It generally succeeds only with very careful maintenance and control of the two most important reaction parameters, viz. fluorine concentration and reaction time.

The sometimes dramatic reaction of fluorine with organic substances has to be, on the one hand, moderated by means of very low fluorine concentrations at the beginning of the reaction so as to avoid undesired degradation and decomposition reactions, with very long reaction times having to be accepted; on the other hand, towards the end of the reaction care has to be taken that the reaction is as complete as possible, by using fluorine concentrations which are as high as possible. Consideration of the energy changes in the reaction of fluorine with organic substrates gives a simple explanation of this behavior:

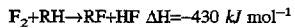
$F_2 + RH \rightarrow RF + HF \quad \Delta H = -430 \; kJ \; mol^{-1}$ The energy liberated in this reaction is sufficient to break a C—C bond (350–370 kJ mol$_{-1}$). Attempts are generally made to master this problem by greatly diluting the fluorine with an inert gas and by cooling the reactants. However, with increasing degree of substitution, i.e. as the reaction progresses, the molecules formed become evermore stable, so that for complete substitution evermore drastic reaction conditions have to be used (removal of cooling, undiluted fluorine). This leads to low product yields and selectivity.

In the industrial use of gas-phase fluorination, e.g. in the formation of barrier layers for plastic fuel containers of high density polyethylene (HDPE), one therefore deliberately refrains, taking economic aspects into account, from completely fluorinating the basic polymer skeleton even in the case of a high F$_2$ excess, i.e. one strives for a compromise between avoiding degradation of the molecule and obtaining as high as possible a degree of fluorine substitution. The reaction can be described by the following overall equation (I).

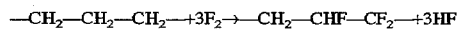
$-CH_2-CH_2-CH_2-+3F_2 \rightarrow -CH_2-CHF-CF_2-+3HF$

However, a decisive step change in the thermal and chemical stability of an organic compound can only be achieved if virtually all carbon substituents are replaced by fluorine atoms. This can be seen from the property spectrum of PE, ETFE and PTFE, as shown in Table I:

TABLE I

Selected physical and chemical properties of HDPE, ETFE* and PTFE:

| Polymer/ Property | HDPE | ETFE | PTFE | Unit |
|---|---|---|---|---|
| Melting range | ~130 | ~270 | ~340 | °C. |
| Temperature range for use | <80 | <150 | <260 | °C. |
| Density | ~0.94 | ~1.75 | 2.2 | g/cm$^3$ |
| Oxidation resistance | moderate | good | excellent | |
| Oxygen permeability | 76 | 67 | 250 | $\frac{cm^3}{m^2 d \; bar}$ |
| Methane permeability | 56 | — | 1.47 | $\frac{cm^3}{m^2 d \; bar}$ |
| Permeability to water vapor | 1 | 0.11 | 0.03 | g/m$^2$d |

*Partially fluorinated thermoplastic (tetrafluoroethylene-ethylene copolymer)

SUMMARY OF THE INVENTION

Accordingly, it is an object of the invention to provide a process for conditioning organic substrate surfaces, which avoids oxidative degradation and fragmentation reactions and improves the prerequisite properties for carrying out subsequent treatment processes. In particular, it should ensure the prerequisites for a quantitative fluorination reaction in accordance with equation (II), i.e. short reaction times and low fluorine concentrations.

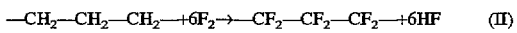
$$-CH_2-CH_2-CH_2-+6F_2 \rightarrow -CF_2-CF_2-CF_2-+6HF \quad (II)$$

This object is achieved according to the present invention by exposing the substrate surface of the organic substrate surface to be conditioned at a temperature between 25° C. and 300° C. to a gas containing hydrogen for improving subsequent treatment processes.

DETAILED DESCRIPTION

Figure 1A:
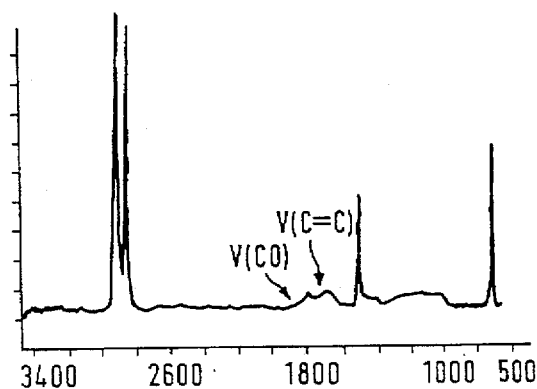
FIGS. 1a–1k are IR spectrum graphs showing the significant decrease in the C—H bands.

It has surprisingly been found that smooth quantitative reaction of elemental fluorine with a hydrocarbon can be achieved when the actual fluorination is preceded, according to the invention, by a treatment step with hydrogen or a hydrogen-containing gas mixture, hereinafter referred to as activation. Where a hydrogen-containing gas mixture is used the hydrogen part of the mixture would contain at least 0.1% by volume of hydrogen. For the industrially important area of gas-phase fluorination of polyethylene (PE) this means that the PE surface can be transformed into a structure analogous to polytetrafluoroethylene (PTFE). This has hitherto not been possible under economical reaction conditions. A fluorinated polyolefin surface treated in this way is, for example, not able to be wetted by water: It is thus distinguished in principle from previously known fluorination processes used in industry. The process principle of the present invention allows the application of hydrophobic fluoropolymers to industrial semifinished or finished products of polyolefins having a sometimes considerably improved chemical and physical property profile (see Table I). These treatment steps can be particularly advantageously carried out in the course of important processing steps for the shaping of plastics (extrusion, injection molding, blow molding, etc.).

Surprisingly, even at room temperature, activation of the substrate surface with hydrogen gives a significant increase in the C—F yield under otherwise constant reaction conditions. This is associated with a significantly improved permeation behavior toward fuels and their additives.

An analogous behavior of the polyolefin surface is found in the reaction with elemental chlorine: While treatment of the unactivated polyolefin surface with chlorine results in virtually no observable replacement of C—H bonds by C—Cl bonds, the preceding activation according to the present invention enables a significant rise in the C—Cl bond content to be observed. This is all the more surprising since the chlorination of hydrocarbons normally has a considerably higher activation energy than fluorination. The activation step obviously reduces the activation energy for this reaction to such an extent that the reaction can be carried out under economical reaction conditions (see Table II).

TABLE II

| | | Activation | | | | Fluorination | | | | Loading | C/F |
|---|---|---|---|---|---|---|---|---|---|---|---|
| No. | Polymer | p [bar] | c [vol %] | t [sec] | T [°C.] | p [bar] | c [vol %] | t [sec] | T [°C.] | [µg/cm$^2$] | ratio |
| 1 | HDPE | — | — | — | — | — | — | — | — | — | — |
| 2 | HDPE | 8 | 12 | 60 | 195 | — | — | — | — | — | — |
| 3 | HD)PE | — | — | — | — | 8 | 1 | 30 | 125 | 25 | 1 |
| 4 | HDPE | 8 | 12 | 60 | 195 | 8 | 1 | 30 | 125 | 87 | 1.9 |
| 5 | HDPE | 8 | 0.5 | 60 | 195 | 8 | 1 | 30 | 125 | 73 | 1.7 |
| 6 | HDPE | — | — | — | — | 0.9 | 10 | 600 | 50 | 27 | 1 |
| 7 | HDPE | 0.9 | 12 | 900 | 27 Chlorination | 0.9 | 10 | 600 | 50 | 91 | 1.9 |
| 8 | HDPE | | | | | 2 | 100 | 30 | 100 | | |
| 9 | HDPE | 8 | 12 | 60 | 195 | 2 | 100 | 30 | 100 | | |

The activation gives, even without subsequent treatment of the polymer surface, a significant improvement in the resistance of the substrate to oxidative degradation, as is virtually unavoidable, in particular, in the processing of industrial thermoplastics as a result of the action of atmospheric oxygen. By this means, on the one hand, a virtually undamaged surface is subsequently modified by a gas-phase reaction, on the other hand it makes possible higher processing temperatures in the production of industrial moldings, which in turn has a favorable effect on the achievable cycle of times and thus on the economics.

EXAMPLES

The invention is illustrated by the following examples:

Small hollow bodies of polyolefins are treated in an autoclave under defined reaction conditions with the appropriate gases or gas mixtures (see Table II).

The treated containers were subsequently characterized by IR spectroscopy using attenuated total reflection (ATR), with the aid of ESCA (Electron Spectroscopy for Chemical Analysis) and by means of elemental analysis (surface loading with F).

Figure 1B:
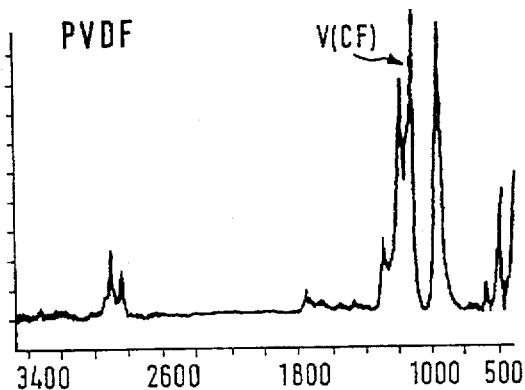
Figure 1C:
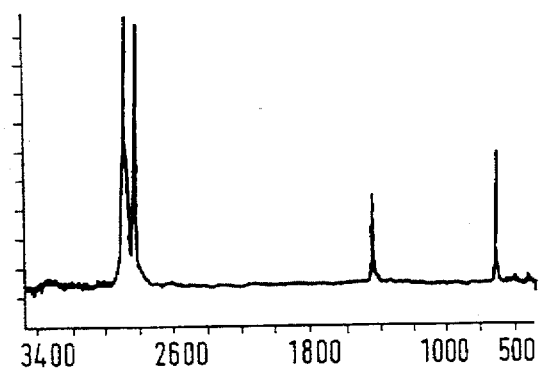
Figure 1D:
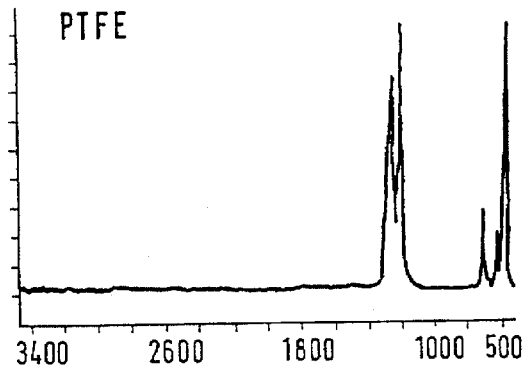
Figure 1E:
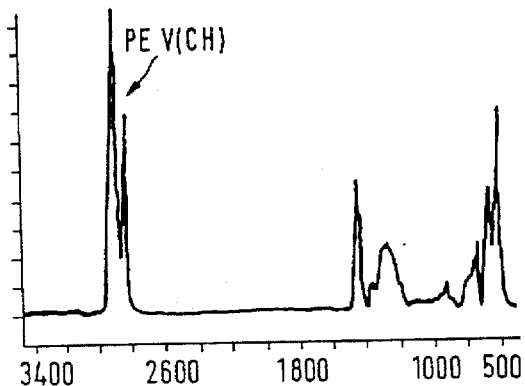
Figure 1F:
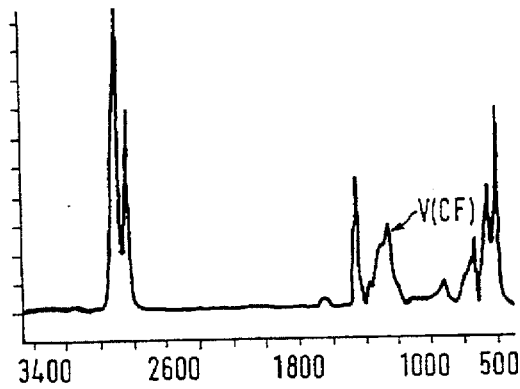
Figure 1G:
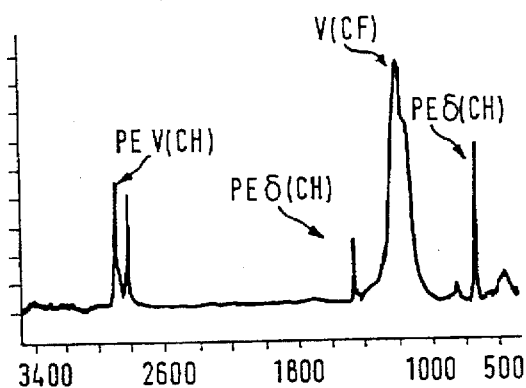
Figure 1H:
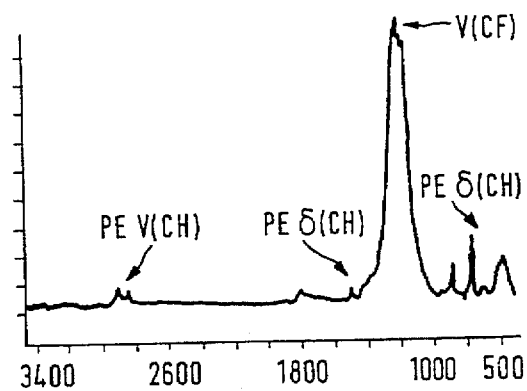
Figure 1I:
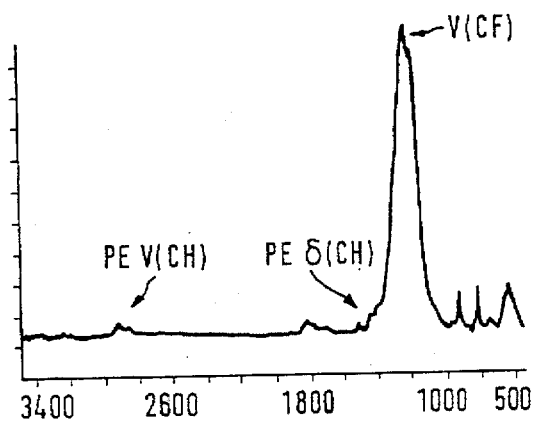
Figure 1J:
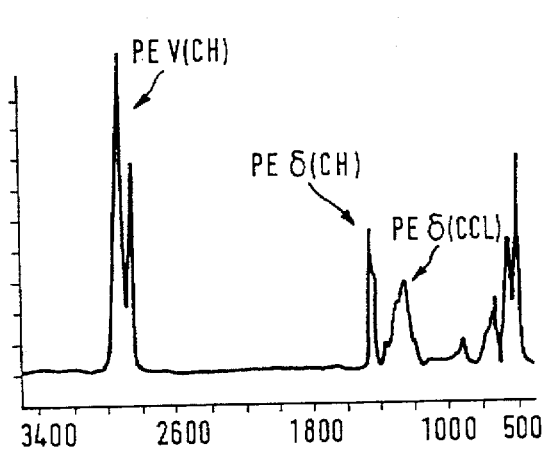
Figure 1K:
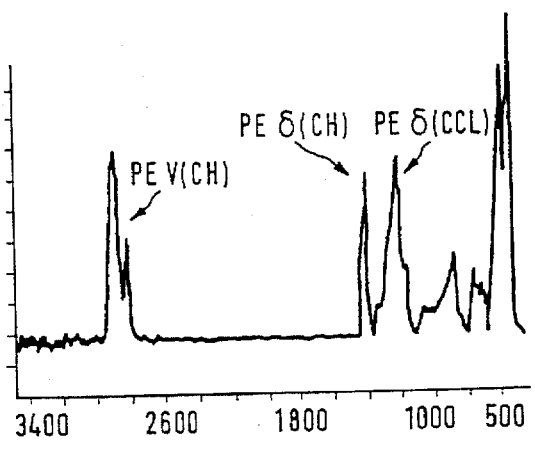
Figure 2A:
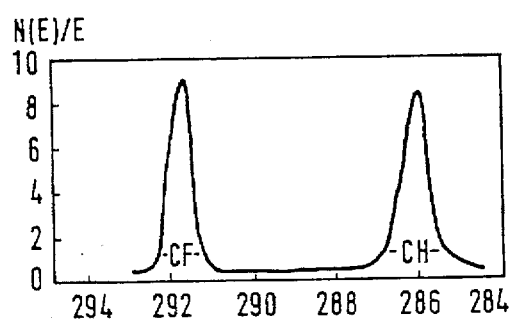
FIGS. 2a–2d are ESCA spectrum graphs.
Figure 2B:
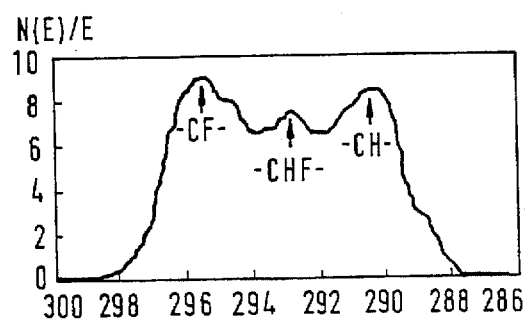
Figure 2C:
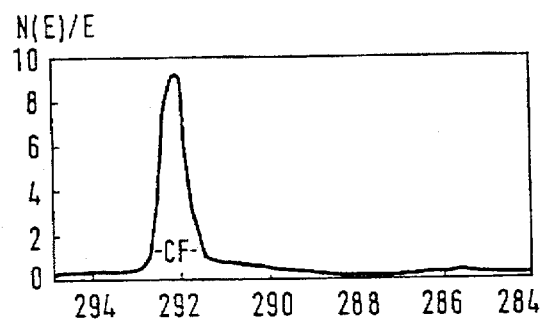
Figure 2D:
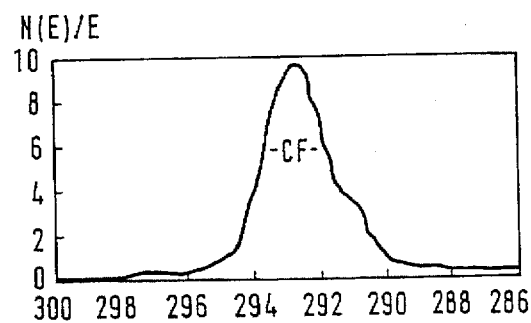

The significant decrease in or the "disappearance" of the C—H bands (CH stretching vibration at about 3000 cm$^{-1}$ in the IR spectrum (FIG. 1) with simultaneous increase in the intensity of the C—F bands at about 1200 cm$^{-1}$ impressively proves the chemical transformation achieved and the step change in properties associated therewith as shown in Table I. At the same time, the ESCA spectrum (FIG. 2) also becomes ever more similar to PTFE. The activated polymer surface (without subsequent treatment) has an absence of C=O and C=C absorption bands at about 1750 cm$^{-1}$ in the IR spectrum, these groups being significant for oxidative degradation of the basic polymer skeleton.

We claim:

1. A process for conditioning organic substrate surfaces for improving a subsequent treatment process which comprises exposing the substrate surfaces, at temperatures between 25° and 300° C. to a hydrogen containing gas, wherein said organic substrate is a polyolefin and said subsequent treatment process is a fluorination step for producing fluorinated polyolefin surfaces not able to be wetted by water.

2. The process of claim 1 wherein the polyolefin is polyethylene.

3. A process for conditioning organic substrate surfaces for improving a subsequent treatment process, which comprises exposing the substrate surfaces at temperatures between 25° and 300° C. to a hydrogen containing gas, wherein said organic substrate is a hydrocarbon and said subsequent treatment process is a fluorination step comprising quantitative reaction of elemental fluorine with the hydrocarbon.

4. The process of claim 3 wherein the fluorination is a gas-phase fluorination of polyethylene.

* * * * *